(12) United States Patent
Loesenbeck

(10) Patent No.: US 10,332,738 B2
(45) Date of Patent: Jun. 25, 2019

(54) LOW-PRESSURE ULTRAVIOLET RADIATOR WITH MULTIPLE FILAMENTS

(71) Applicant: Xylem IP Management S.à r.l., Senningerberg (LU)

(72) Inventor: Jan Boris Loesenbeck, Bielefeld (DE)

(73) Assignee: XYLEM IP MANAGEMENT S.À R.L., Luxembourg (LU)

( * ) Notice: Subject to any disclaimer, the term of this patent is extended or adjusted under 35 U.S.C. 154(b) by 0 days.

(21) Appl. No.: 16/078,812

(22) PCT Filed: Feb. 8, 2017

(86) PCT No.: PCT/EP2017/052723
§ 371 (c)(1),
(2) Date: Aug. 22, 2018

(87) PCT Pub. No.: WO2017/144273
PCT Pub. Date: Aug. 31, 2017

(65) Prior Publication Data
US 2019/0066996 A1    Feb. 28, 2019

(30) Foreign Application Priority Data
Feb. 23, 2016 (EP) ..................................... 16156959

(51) Int. Cl.
*H01K 1/28* (2006.01)
*H01K 9/08* (2006.01)
(Continued)

(52) U.S. Cl.
CPC ............... *H01K 9/08* (2013.01); *C02F 1/325* (2013.01); *H01J 61/72* (2013.01); *H01J 61/92* (2013.01);
(Continued)

(58) Field of Classification Search
CPC .... H01K 9/08; H01K 1/28; H01K 1/16; H01J 61/92; H01J 61/72; C02F 2201/322; C02F 2303/04
See application file for complete search history.

(56) References Cited

U.S. PATENT DOCUMENTS 2,089,654 A * 8/1937 Le Van ................... H01J 17/52
220/2.2
2,363,531 A * 11/1944 Johnson .............. H01J 61/0732
313/112
(Continued)

FOREIGN PATENT DOCUMENTS

CN        1812677 A     8/2006
CN      101644389 A     2/2010
(Continued)

OTHER PUBLICATIONS

International Search Report and Written Opinion for International Application No. PCT/EP2017/052723, dated Jun. 7, 2017—12 pages.

*Primary Examiner* — Douglas W Owens
*Assistant Examiner* — Jianzi Chen
(74) *Attorney, Agent, or Firm* — RatnerPrestia

(57) ABSTRACT

A low pressure mercury gas discharge ultraviolet lamp with a tubular elongate body with two opposing ends, a first end and a second end, which contains a gas filling, and with at least two electric connectors at each end, which are electrically connected to at least one filament being provided at each end. A discharge length is defined between the filaments, in which at least two filaments are provided at each end of the discharge length. The filaments can be individually supplied with electric energy. The at least two filaments at the first end are of different size and different mass, and the at least two filaments at the second end are of different size and different mass.

8 Claims, 1 Drawing Sheet

(51) Int. Cl.
*C02F 1/32* (2006.01)
*H01J 61/72* (2006.01)
*H01J 61/92* (2006.01)
*H01K 1/16* (2006.01)
*H05B 39/04* (2006.01)

(52) U.S. Cl.
CPC ............... *H01K 1/16* (2013.01); *H01K 1/28* (2013.01); *H05B 39/04* (2013.01); *C02F 2201/322* (2013.01); *C02F 2303/04* (2013.01)

(56) References Cited

U.S. PATENT DOCUMENTS

| | | | |
|---|---|---|---|
| 4,748,368 A | | 5/1988 | Wilson et al. |
| 4,835,442 A | * | 5/1989 | Sugimoto ............... H01J 61/28 313/17 |
| 5,148,461 A | * | 9/1992 | Shoulders ................ H01J 1/30 378/119 |
| 6,756,745 B1 | * | 6/2004 | Lin ........................ H01J 61/72 315/265 |

FOREIGN PATENT DOCUMENTS

| | | |
|---|---|---|
| EP | 0040547 A1 | 11/1981 |
| JP | 55144650 A | 11/1980 |
| JP | 08273593 A | 10/1996 |

* cited by examiner

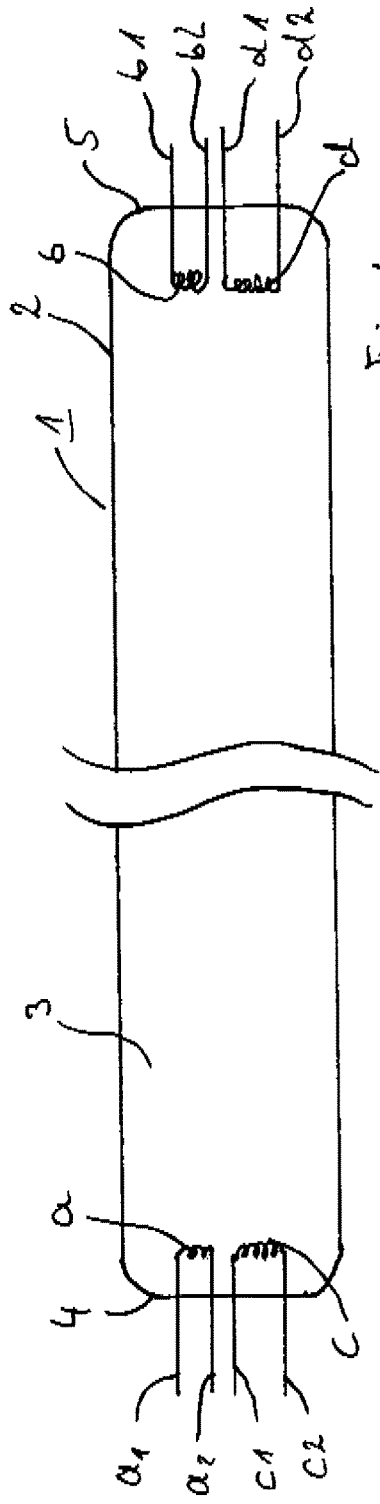
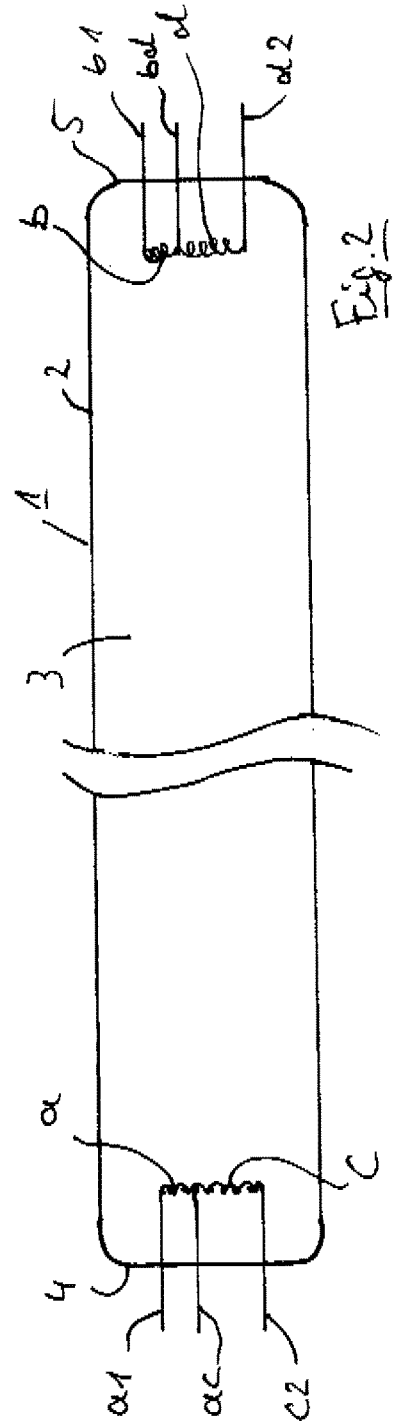
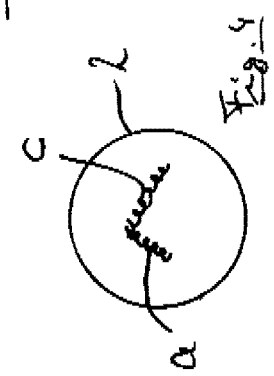
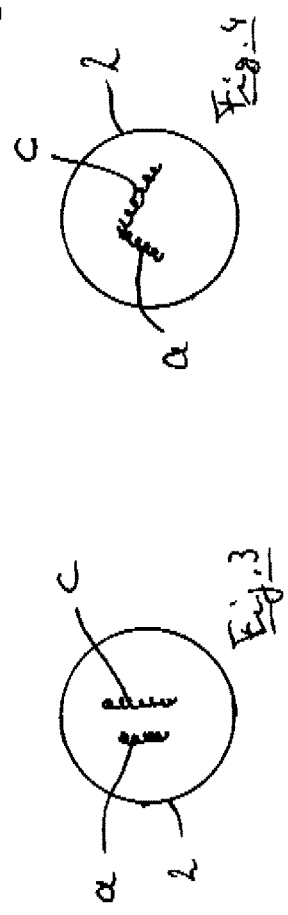

LOW-PRESSURE ULTRAVIOLET RADIATOR WITH MULTIPLE FILAMENTS

CROSS-REFERENCE TO RELATED APPLICATIONS

This patent application is a U.S. National Phase Patent Application of PCT Application No.: PCT/EP2017/052723, filed Feb. 8, 2017, which claims priority to European Patent Application No. 16156959.5, filed Feb. 23, 2016, each of which is incorporated by reference herein in its entirety.

FIELD OF THE INVENTION

The present invention relates to a low-pressure mercury gas discharge lamp of the type used for disinfection purposes with ultraviolet radiation, and to a method of operating such lamps.

BACKGROUND OF THE INVENTION

Low-pressure mercury gas discharge lamps are widely used in the field of lighting, but also in the field of disinfection because of their pre-dominant output of ultraviolet radiation, which has a germicidal effect. In disinfection applications, the terms "UV lamp" and "UV radiator" are used as equivalents for high-output low-pressure mercury gas discharge lamps. These terms will be used in the present specification as well.

While in lighting applications, the main requirements are a balanced spectrum in the visible wavelength range, a high efficiency of the light output in relation to the electric power consumption and a long service life, the requirements of ultraviolet (UV) radiators are different. The ultraviolet output has to be very high because the intensity of the ultraviolet radiation is directly correlated with the disinfection efficiency, which means that fewer UV radiators with a higher UV output can be used for disinfecting water, and that directly reduces the investment necessary for drinking water or wastewater disinfection installations. Another important requirement of UV radiators for disinfection purposes in larger installations is the total power consumption. In drinking water and wastewater applications, the volume of water per time unit, (i.e. cubic meters per second) can vary significantly. In order not to waste unnecessary amounts of ultraviolet radiation and the electric energy associated with its production, several techniques have been developed to adapt the output of UV plants to the water flow. There are solutions in which the water is treated in several parallel channels, each being equipped with a number of UV radiators, and in which individual channels can be closed when the water flow is low. Other applications provide for the possibility to reduce the electric power input of the lamps and consequently dim the lamps to a lower UV output when the water flow is low. Dimming UV lamps of the low pressure mercury type is limited to about 30% of the nominal power output because the filaments at the ends of the lamp are heated by electric discharge in the lamp, and if the electric power supplied to the discharge is reduced, the temperatures of the filaments are also reduced. At a certain point, the filaments get too cold to provide the necessary electron emission. There is the risk that the lamp ceases to function, but also the risk that the filament is damaged when it is operated at too low temperatures. Therefore, there is a lower limit for the electric input of UV lamps.

For lighting purposes, there are several prior art documents known which use more than one filament at each end of the lamp. Such prior art documents are Chinese patent application CN 1812677 A and Chinese patent CN 101644389 B, and U.S. Pat. No. 6,756,745 B1. These lamps are used for lighting purposes and suggest multiple filaments, which are redundant in the sense that, if one filament is defective, the other filament can be switched on. There is no disclosure that the filaments can be of different size and mass. As discussed above, the technical challenges in lighting applications are different from those in ultraviolet disinfection applications.

SUMMARY OF THE INVENTION

It is therefore an object of the present invention to provide a UV low-pressure mercury gas discharge lamp which has the capability of being safely operated at low power levels, i.e. below 30% of the nominal power output and especially down to about 10% of the nominal power output. It is another object of the present invention to provide a method for operating UV low-pressure mercury gas discharge lamps at different power levels, especially in which power levels are varied at least by a factor of 4, and preferably up to a factor of 10 between the lowest and the highest power.

This object is achieved by a UV low-pressure mercury gas discharge lamp and by a method for operating such a lamp.

The desired effect is achieved in a lamp by providing two filaments at each end of the discharge length, wherein the filaments can be individually supplied with electric energy, and wherein the filaments at each end are of different size and different mass, the difference being more than the difference stemming from inevitable production inaccuracies. This construction allows the lamp to be operated in different modes, namely a high power mode in which the electric energy is supplied to the larger filament, which also has the higher mass, and in a low power mode in which the smaller filament, which also has a lower mass, is powered. Especially the object of the invention is solved by a low pressure mercury gas discharge ultraviolet lamp with a tubular elongate body with two opposing ends, a first end and a second end, which contains a gas filling, and with at least two electric connectors at each end, which are electrically connected to at least one filament being provided at each end, wherein a discharge length is defined between the filaments, in which at least two filaments are provided at each end of the discharge length, wherein the filaments can be individually supplied with electric energy, and wherein the at least two filaments at the first end are of different size and different mass, and the at least two filaments at the second end are of different size and different mass Optionally, the two filaments can be supplied with power simultaneously, which leads to an even higher electric power input and hence to a higher UV output. If the smaller and lighter filament is supplied with electric power, then the necessary operating temperature of the smaller filament can be reached at lower electric power input levels because there is only a small surface area and consequently a small mass which has to be heated by the energy of the discharge arc. At a given electric power, the temperature of the smaller filament is therefore higher than the temperature of a larger filament would be. Consequently, if a lower limit of the operating temperature exists, as it does, the lamp can be operated at a low power input level, as low as 10% of the nominal power input. This low limit has not been achieved so far. The lamp can be operated at this power for extended times without damaging the filament.

BRIEF DESCRIPTION OF THE DRAWING FIGURES

Two preferred embodiments will be described with reference to the drawings, which show:

FIG. 1: a low-pressure gas discharge lamp with four filaments which are individually contacted;

FIG. 2: a low-pressure gas discharge lamp with four filaments, in which each pair of filaments has one common connector;

FIG. 3: a view in axial direction of a filament arrangement; and

FIG. 4: a view in axial direction of an alternative filament arrangement.

DETAILED DESCRIPTION OF THE INVENTION

FIG. 1 shows a low-pressure mercury gas discharge lamp 1 with a quartz body 2 of longitudinal, cylindrical shape. Inside the body 2 there is a gas filling 3 which usually comprises a noble gas and a small amount of mercury. In the two opposing ends, first end 4 and second end 5, there are filaments a, b, c and d provided. The filaments are supported inside the lamp body 2 by two electrical connections each, that is electrical connections a1 and a2 of filament a, connections b1 and b2 of filament b, connections c1 and c2 of filament c and connections d1 and d2 of filament d. The connections a1 to d2 are electric conductors of sufficient temperature resistance to be molten into the quartz body 2 and of sufficient rigidity to support the filaments a to d under the mechanical load that can be expected under operation. The filaments may also be mounted staggered in the lamp.

As FIG. 1 illustrates, the filaments a and b are filaments of a relatively short length. These filaments are covered with known substances to improve electron emission under elevated temperatures.

Similarly, the filaments c and d are relatively long filaments. They are of the same mechanical and physical composition as the filaments a and b, but significantly longer. Preferably, the filaments a and b on the one hand and c and d on the other hand are of the same basic wire material, so that the difference in length of the filaments leads to a different mass of the filaments. Filaments a and b are lighter than filaments c and d. The filaments can also be made from different material.

FIG. 2 shows an arrangement similar to FIG. 1. The same numerals are used for the same or similar components.

In FIG. 2, an embodiment uses a pair of small filaments a and b and a second pair of larger filaments c and d. However, in this embodiment, the filaments at the end portion 4 of the lamp 1 share a common electric connection ac. This means that the smaller filament a can be contacted through two electric connections a1 and ac, while the second filament c can be contacted through the connections ac and c2.

The corresponding arrangement on the other end 5 of lamp 1 shows a shorter filament b with electric connection b1 and bd and longer filament d with electrical connections bd and d2. Accordingly, the filaments b and d share one common connection bd. Filament b can be contacted electrically via connections d1 and bd, while the filament d can be contacted through the connections bd and d2.

FIG. 3 shows a filament arrangement in a view in axial direction. The lamp body 2 surrounds a short filament a and a long filament c. The connections a1, a2; c1, c2 are not visible in this view. The arrangement of FIG. 3 may be used in embodiments like the one shown in FIG. 1 in which the filaments a and c are individually contacted through four independent connectors.

An embodiment with shared connectors is represented in FIG. 4. In this embodiment, the lamp body 2 surrounds filaments a and c, which are physically and electrically connected to each other at one end. This end is contacted and held by the common connector ac, which is not visible in this representation, because, like connectors a1 and c2, they are oriented vertically with respect to the plane of the drawing.

In operation, the low-pressure mercury gas discharge lamps 1 of FIG. 1 and FIG. 2 are UV radiators of the so-called low-pressure/high output type. These lamps can be operated at roughly 200 Watts of power input. The exact number is not relevant in the present context.

The process for powering up the lamp 1 is known from conventional UV radiators of this type. Firstly, a DC current is supplied to connectors c1 and c2 of filament c and connectors d1 and d2 of filament d (in the embodiment of FIG. 1). Filaments c and d are heated to an elevated temperature until the desired temperature for thermal electron emission is reached, which is about 1,000 K. For heating purposes the filaments can also be operated with AC current. At this point, high voltage is applied to the filaments c and d via connectors c1 and c2 and d1 and d2 respectively. The high voltage can also be supplied only to one connector of each filament c and d. This high voltage leads to a gas charge in the gas filling 3, and consequently to the production of ultraviolet radiation. The current through the filaments c and d and through the plasma which carries the gas discharge inside the lamp is sufficient to keep the filaments c and d at the desired temperature level which is necessary for a long service life of the filaments. Now if for any reason the electric power supplied to the lamp shall be reduced, for example because the water flow to be disinfected is reduced and less UV radiation is necessary, the high voltage supply can be reduced in a known manner, which results in less energy being available in the plasma and consequently less temperature being produced in the filaments c and d. This reduction is technically possible down to about 40% or 30% of the nominal power input of the lamp. At this point, the filaments c and d get too cold for thermal electron emission and, although the lamp still works, the filaments are subject to premature wear.

At this point, the smaller filaments a and b can be powered up. Depending on the construction of the lamp, they are already at an elevated temperature which is sufficient to support the gas discharge, or they may be pre-heated by application of direct current to the connectors a1, a2 and b1, b2. As soon as the desired temperature of the filaments a and b is reached, these can be powered by high voltage as described above, and the high voltage supply to the filaments c and d can be disconnected. The lamp can be operated at a reduced power input now. The smaller filaments with lower mass compared with filaments c and d are then heated by the relatively low electric current which supports the gas discharge. The lower mass, however, leads to a higher temperature under these operating conditions. Therefore, the filaments a and b will still reach sufficient operating temperature down to reduced power levels of about 30% to 10% of the nominal power input of the lamp. Physically, the lower mass is equivalent to a lower total heat capacity, and the smaller surface area leads to reduce energy losses via black body radiation.

Switching from the filaments c and d to filaments a and b therefore allows a further reduction of the power input of the lamp 1 without decreasing the service life of the filaments.

Likewise, the lamp in FIG. 2 can be operated accordingly. The difference of the embodiment in FIG. 2 is that the common filament ac and bd can be used as a ground connector for the DC current while the high voltage is usually supplied to connectors c2 and d2 under high power load, and to connectors a1 and b1 under low power.

The filaments of one side, a,c or b,d, may be switched in a pulsed pattern with or without overlap. The switching of filaments can take place at the end or within the end of the UV lamp.

The present invention as described in non-limiting embodiments above can preferably used in UV disinfection plants for drinking water and wastewater in which the power output of the UV radiators can be reduced when less water volume per time unit has to be treated. It is possible to reduce the power of the UV lamp to low power levels, which could not be achieved so far. This gives the operators of such UV disinfection plants the chance to achieve significant savings in operating costs.

Alternative embodiments, which have not been described so far, can comprise more than two filaments at each end.

The invention claimed is:

1. A low pressure mercury gas discharge ultraviolet lamp comprising:
   a tubular elongate body containing a gas filling and including a first end and an opposing second end,
   at least two electric connectors at each end of the tubular elongated body, which are electrically connected to at least one filament at each end, a discharge length (I) being defined between the filaments at the opposite ends,
   wherein at least two filaments (a,c and b,d) are provided at each end of the discharge length (I), wherein the filaments (a,c;b,d) are configured to be individually supplied with electric energy, and wherein the at least two filaments (a,c) at the first end are of different size and different mass, and the at least two filaments (b,d) at the second end are of different size and different mass.

2. The low pressure mercury gas discharge ultraviolet lamp according to claim 1, wherein a ratio of masses of the filament (c, d) having a relatively larger mass to the filament (a, b) having a relatively lower mass is greater than 1.5.

3. The low pressure mercury gas discharge ultraviolet lamp according to claim 1, wherein the filaments (a,b,c,d) are each separately connected to two connectors.

4. The low pressure mercury gas discharge ultraviolet lamp according to claim 1, wherein the filaments (a, c) at the first end are connected to each other and to a common connector, and the filaments (b, d) at the second end are connected to each other and to another common connector.

5. A method of operating a low pressure mercury gas discharge ultraviolet lamp comprising a tubular elongate body containing a gas filling and including a first end and an opposing second end, at least two electric connectors at each end of the tubular elongated body, which are electrically connected to at least one filament at each end, a discharge length (I) being defined between the filaments at the opposite ends, wherein at least two filaments (a,c and b,d) are provided at each end of the discharge length (I), wherein the filaments (a,c;b,d) are configured to be individually supplied with electric energy, and wherein the at least two filaments (a,c) at the first end are of different size and different mass, and the at least two filaments (b,d) at the second end are of different size and different mass, said method comprising:
   operating the lamp in different modes including a high power mode in which the electric energy is supplied to a larger filament, which also is of higher mass, and a low power mode in which a smaller filament, which also is of lower mass, is powered.

6. A method according to claim 5, wherein the lamp in the high power mode is configured to carry electric power at a maximum of 100%, and, in the low power mode, the electric power is reduced to below 30% of the maximum.

7. A method according to claim 5, wherein the lamp in high power mode is configured to carry electric power at a maximum of 100%, and, in the low power mode, the electric power is reduced to between 30% and 10% of the maximum.

8. A method according to claim 5, wherein in a highest power mode the lower mass filaments (a, c) and the higher mass filaments (b, d) are supplied with electric power simultaneously.

* * * * *